(12) United States Patent
Feola

(10) Patent No.: US 8,335,587 B2
(45) Date of Patent: Dec. 18, 2012

(54) FROZEN CONFECTION MACHINE

(75) Inventor: Anthony V. Feola, Boston, MA (US)

(73) Assignee: Anthony V. Feola, Medford, MA (US)

( * ) Notice: Subject to any disclaimer, the term of this patent is extended or adjusted under 35 U.S.C. 154(b) by 670 days.

(21) Appl. No.: 11/800,959

(22) Filed: May 8, 2007

(65) Prior Publication Data
US 2007/0262081 A1 Nov. 15, 2007

Related U.S. Application Data

(60) Provisional application No. 60/798,638, filed on May 8, 2006.

(51) Int. Cl.
G06F 17/00 (2006.01)
G06F 19/00 (2011.01)
(52) U.S. Cl. ......... 700/239; 700/233; 700/232; 700/240
(58) Field of Classification Search ........... 700/231–244
See application file for complete search history.

(56) References Cited

U.S. PATENT DOCUMENTS

| | | | |
|---|---|---|---|
| 1,782,596 A | 11/1930 | Beilgard et al. | |
| 1,817,114 A | 8/1931 | Valenta | |
| 2,925,347 A | 2/1960 | Cummings et al. | |
| 3,441,418 A | 4/1969 | Nishikiori | |
| 3,521,666 A | 7/1970 | Scaramucci | |
| 3,615,675 A | 10/1971 | Wisdom et al. | |
| 3,677,443 A | 7/1972 | Smadar et al. | |
| 3,898,859 A | 8/1975 | Duke | |
| 4,020,188 A | 4/1977 | Forkner | |
| 4,109,775 A | 8/1978 | Hayashi | |
| 4,171,380 A | 10/1979 | Forkner | |
| 4,201,558 A | 5/1980 | Schwitters et al. | |
| 4,203,461 A | 5/1980 | Schwitters | |
| 4,237,536 A * | 12/1980 | Enelow et al. | 705/413 |
| 4,275,567 A | 6/1981 | Schwitters | |
| 4,364,491 A | 12/1982 | Adamson | |

(Continued)

FOREIGN PATENT DOCUMENTS

EP 0285709 12/1988

(Continued)

OTHER PUBLICATIONS

Julia Child, et al.; "Mastering the Art of French Cooking"; 1974, vol. 1, pp. 177-180.

(Continued)

Primary Examiner — Michael K Collins
(74) Attorney, Agent, or Firm — Christopher & Weisberg, P.A.

(57) ABSTRACT

An edible item is prepared by identifying a number of edible items; associating a predetermined portion of confection with each of the edible items; associating an item identifier with each of the edible items and with the predetermined portion of confection; providing a supply of confection; presenting a selection of item identifiers on a visual display; selecting a single item identifier from the product identifiers presented on the visual display; and dispensing the predetermined portion of confection associated with the edible item associated with the item identifier. Data can be collected related to one of the selection of the single item identifier and the predetermined portion of confection dispensed; and the data can be stored for recall, display, output, and/or transmission. Information about the supply of confection, including supply amount available for dispensing, temperature, consistency, and other characteristics can be stored, displayed, or transmitted.

13 Claims, 12 Drawing Sheets

U.S. PATENT DOCUMENTS

| | | |
|---|---|---|
| 4,364,666 A | 12/1982 | Keyes |
| 4,390,760 A | 6/1983 | Schwitters |
| 4,393,659 A | 7/1983 | Keyes et al. |
| 4,427,703 A | 1/1984 | Schafer et al. |
| 4,544,085 A | 10/1985 | Frazer |
| 4,569,848 A | 2/1986 | Giorgetti et al. |
| 4,580,905 A | 4/1986 | Schwitters et al. |
| 4,645,093 A | 2/1987 | Jones |
| 4,707,997 A | 11/1987 | Bigler et al. |
| 4,732,013 A | 3/1988 | Beck |
| 4,741,908 A | 5/1988 | Brooks et al. |
| 4,752,488 A | 6/1988 | Hayashi et al. |
| 4,758,143 A | 7/1988 | Lopes |
| 4,788,071 A | 11/1988 | Hayashi et al. |
| 4,793,279 A | 12/1988 | Grenier |
| 4,822,627 A | 4/1989 | Clegg et al. |
| 4,878,760 A | 11/1989 | Newton et al. |
| 4,910,030 A | 3/1990 | Trojahn |
| 4,958,747 A | 9/1990 | Sheets |
| 5,025,840 A | 6/1991 | Tacke |
| 5,044,517 A | 9/1991 | U Park |
| 5,283,070 A | 2/1994 | Bertrand et al. |
| 5,400,614 A | 3/1995 | Feola |
| 5,464,120 A | 11/1995 | Alpers et al. |
| 5,620,115 A | 4/1997 | McGill |
| 5,931,343 A | 8/1999 | Topar et al. |
| 5,957,040 A | 9/1999 | Feola |
| 6,325,250 B1 | 12/2001 | Feola |
| 6,347,723 B1 * | 2/2002 | Barlian et al. .................... 222/1 |
| 6,419,121 B1 * | 7/2002 | Gutierrez et al. .......... 222/146.5 |
| 6,485,768 B2 | 11/2002 | Feola |
| 6,705,106 B1 * | 3/2004 | Cunha et al. .................... 62/342 |
| 6,723,361 B2 | 4/2004 | Feola |
| 6,766,656 B1 * | 7/2004 | Crisp et al. ...................... 62/389 |
| 6,871,015 B2 * | 3/2005 | Gutierrez et al. ............. 392/470 |
| 6,938,801 B1 * | 9/2005 | Reddy et al. ................... 222/214 |
| 6,990,391 B1 * | 1/2006 | Cunha et al. ................... 700/237 |
| 7,617,850 B1 * | 11/2009 | Dorney .......................... 141/94 |
| 7,651,015 B2 * | 1/2010 | Girard et al. ................... 222/509 |
| 2004/0238555 A1 * | 12/2004 | Parks .............................. 221/80 |
| 2009/0105875 A1 * | 4/2009 | Wiles ............................. 700/239 |

FOREIGN PATENT DOCUMENTS

| | | |
|---|---|---|
| GB | 2172541 | 9/1986 |
| WO | 9007280 | 7/1990 |

OTHER PUBLICATIONS

Woman'S Day; "Encyclopedia of Cookery"; 1966, vol. 4, p. 594.

\* cited by examiner n-jectibles

| SYSTEM | MULTI STATE INDICATOR | CLEAN CYCLE |
| --- | --- | --- |
| RUNNING | PRODUCT READY | PUSH TO STOP |
| STOP | | PURGE NOZZLE |
| | | CLOSE |

| COMPRESSOR | ON |
| --- | --- |
| BEATER | ON |
| MIX PUMP | ON |

HG OUTPUT  0

MTR AMPS  0.00

| STANDBY ACTIVE | SELECTION 1 | SELECTION 2 | START UP SCREEN | BEATER SETUP | OPERATIONS | SETUP SCREEN |

FIG. 9

FROZEN CONFECTION MACHINE

CROSS-REFERENCE TO RELATED APPLICATION

This application is related to and claims priority to U.S. Provisional Patent Application Ser. No. 60/798,638, filed May 8, 2006, entitled FROZEN CONFECTION MACHINE, the entirety of which is incorporated herein by reference.

STATEMENT REGARDING FEDERALLY SPONSORED RESEARCH OR DEVELOPMENT n/a

FIELD OF THE INVENTION

The present invention relates to food processing machines and methods, and more particularly to a machine for preparing and dispensing edible frozen product and a method for making food products using the machine.

BACKGROUND OF THE INVENTION

Machines are known for processing and dispensing frozen dessert product such as soft-serve ice-cream and yogurt. Machines commonly used at retail establishments include a refrigerated chamber into which dessert mix is fed or pumped from a bucket or hopper. Blades or beaters churn the dessert mix to a desired consistency and the dessert mix is dispensed from a gravity-fed, manually-operated tap and allowed to flow into an open top cup or cone.

A different type of machine is disclosed in U.S. Pat. Nos. 5,957,040; 5,400,614; 5,957,040; 6,325,250; 6,485,768; and 6,723,361, all incorporated by reference, wherein an injection system is provided for extruding a selectable, predetermined volume of dessert mix. Further, the disclosed machine includes an injection nozzle that permits the dessert mix to be deposited within or injected into other than open containers or cones, such as into baked goods or other edible items.

Although the above referenced machines represent a significant departure from the known soft-serve ice-cream machines, they, like their predecessors, can be tedious and potentially unsanitary to operate and to clean. More specifically, known ice-cream machines must be very carefully cleaned as they process easily spoiled dairy products. Because known machines cannot retain usable dessert mix for an extended inactive period, not only does this waste dessert mix, but the known manual cleaning techniques are often incompletely or improperly performed by workers at the end of their shift. Further, refilling and restarting the machine can be tedious; and often the first batches of product produced are inconsistent and substandard in quality.

In view of these and other deficiencies of known machines, it would be desirable to reduce the frequency of filling, emptying and cleaning the machines; and when these procedure are accomplished, it would be preferable from a safety and quality standpoint to automate these procedures to the greatest extent possible. Further, it would be desirable to preserve dessert mix during extended inactive periods of operation.

Yet another shortcoming of existing machines is the inability to accurately dispense no more or less than a predetermined confection amount for a wide range of products. Further, existing machines do not provide usage and production detail that would be helpful in inventory controls, determination of shrinkage, and cost or royalty accounting.

SUMMARY OF THE INVENTION

The present invention improves upon exiting desert dispensing machines by providing features that allow for automated operation of many functions previously done, step by step in a manual fashion to improve cleanliness and performance of the machine. Additionally, the present invention has a hibernation mode that allows dessert mix to remain in the machine overnight, thereby reducing the frequency of internal cleaning operations. Also, the present invention includes a programmable control system in communication with a graphical operator interface and a data storage and/or transmission unit that simplifies operation, creates more consistent product, and provides comprehensive machine usage and product production data.

An exemplary embodiment of a dessert dispensing apparatus may include a programmable controller having a storage medium for storing operating parameters and/or commands for use of the apparatus. The dessert apparatus may further include a refrigeration system for cooling various components of the apparatus, as well as a mixing system including a mixing container for the preparation of edible product and a beater motor and rod for agitating and/or otherwise stirring the ingredients of the mixing container. The dessert apparatus may further include a dispensing system including one or more nozzles and/or plungers which may be electrically or pneumatically operated for dispensing dessert product from the apparatus. Each of the refrigeration system, mixing system, and dispensing system may be in communication with the programmable controller, where the programmable controller is able to control the various components of each of these systems. An operator interface may further be included with the dessert apparatus, where the operator interface allows a user to interact with and/or control the various functions of the dessert machine.

In an exemplary method of operating the dessert dispensing apparatus, a standby condition having one or more predetermined steps may be stored in the programmable controller for subsequent recall and execution. For example, during normal use in which the edible product is being produced and dispensed, the refrigeration system may be operating according to a first preset temperature. Alternatively, operation of the apparatus may include an assessment of the operating conditions, such as amperage of the beater motor of the mixing system. Either way, the dessert machine includes a first, preset operating condition for producing product. The standby condition may include a series of predetermined steps and/or parameters for operation of the apparatus when production of dessert is not needed or undesired, such as overnight or other prolonged durations of non-use. The standby condition may include turning off the mixing system, including the beater motor. The standby condition may further include a second preset temperature higher than the first temperature at which dessert is produced. The second preset temperature may be sufficiently cold to keep any unused product from spoiling and/or to prevent contamination, but may be significantly warmer than the first preset temperature to thereby conserve the apparatus when not in use, as well as conserving resources used in operating the machine at a production level.

In an exemplary method, an edible item is prepared by identifying a number of edible items; associating a predetermined portion of confection with each of the edible items; associating an item identifier with each of the edible items and with the predetermined portion of confection; providing a supply of confection; presenting a selection of item identifiers on a visual display; selecting a single item identifier from the product identifiers presented on the visual display; and dispensing the predetermined portion of confection associated with the edible item associated with the item identifier.

The method can further include collecting data related to one of the selection of the single item identifier and the predetermined portion of confection dispensed; and the data can be stored for recall, display, output, and/or transmission. Information about the supply of confection, including supply amount available for dispensing, temperature, consistency, and other characteristics can be stored, displayed, or transmitted.

An enabling device can be provided that must be activated before the predetermined portion of confection can be dispensed. Exemplary enabling devices include a proximity sensor and an optical sensor.

In an exemplary method of operating the dessert dispensing machine, a cleaning cycle having one or more predetermined steps may be stored in the programmable controller for subsequent recall. The predetermined steps may include deactivating or otherwise turning off a portion of the refrigeration system and/or the mixing system. The cleaning cycle may further include actuating one or more components of the dispensing system for a preset duration of time to remove or purge unused product from the apparatus. An additional step of the cleaning cycle may include circulating water and/or a cleaning solution throughout one or more portions of the apparatus, including the refrigeration, mixing, and/or dispensing systems for a predetermined duration of time. Upon completion, the cleaning cycle may include turning off power to one or more of the components of the apparatus until the apparatus is used again. The cleaning cycle may be initiated by a simple interaction with the operator interface, for example, by touching a cleaning indicator on a touch screen of the apparatus, the complete cleaning cycle may be initiated and completed without any remaining input needed from a user.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 9 depicts another simulated display of an operator interface of a dispensing apparatus of the present invention;

DETAILED DESCRIPTION OF THE INVENTION

The present invention provides a dispensing apparatus 10 for dispensing or injecting a flowable edible product into an item having a void or voids therein, or an item having low density suitable for receiving a flowable edible product. Such items may include pastries, baked goods, fruit, chocolate shells, as well as containers or beverage bottles. As used herein, the term "frozen edible product" is intended to encompass a cold, edible, and flowable substance such as ice cream, ice milk, yogurt, pudding, artificial edible product which generally has the consistency of "soft serve" ice cream.

Figure 1:
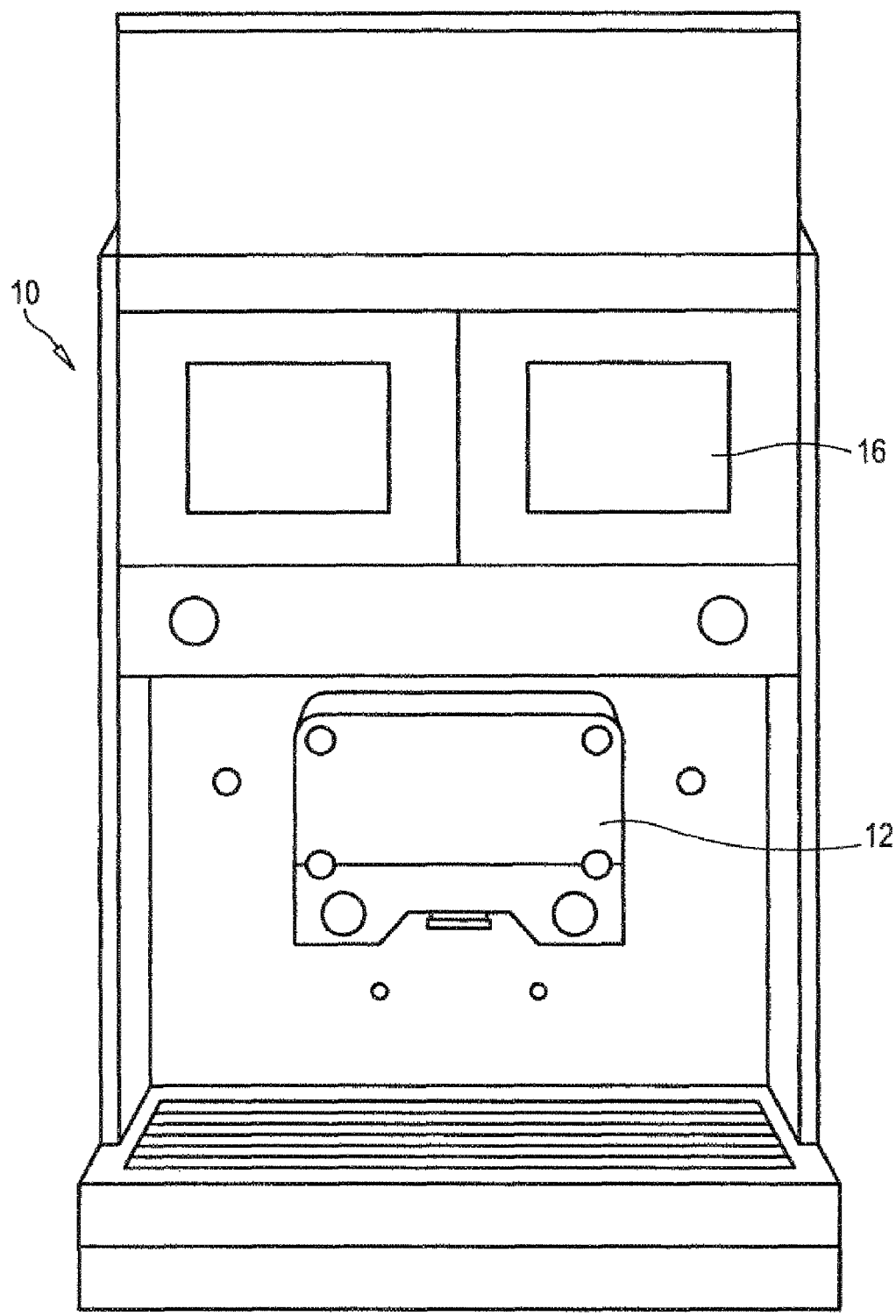
FIG. 1 illustrates an embodiment of a dispensing apparatus of the present invention.

Now referring to FIG. 1, an embodiment of a frozen edible product dispensing machine providing controllable extrusion of a frozen edible product is shown. The machine includes a housing having front, top, and side portions. An outlet port or dispensing system 12 is located at the front of the machine for extruding a frozen edible product. The dispensing apparatus 10 may include one or more substantially identical yet independently operated dispensing outputs. The machine of the present invention generally includes an electrical system 14, an operator interface 16, a refrigeration system, a product preparation system, and the dispensing system 12. The electrical system of the apparatus 10 has a control circuit that is programmable via the operator interface disposed on the machine operator interface allows an operator to control extrusion of the frozen edible product.

Figure 2:
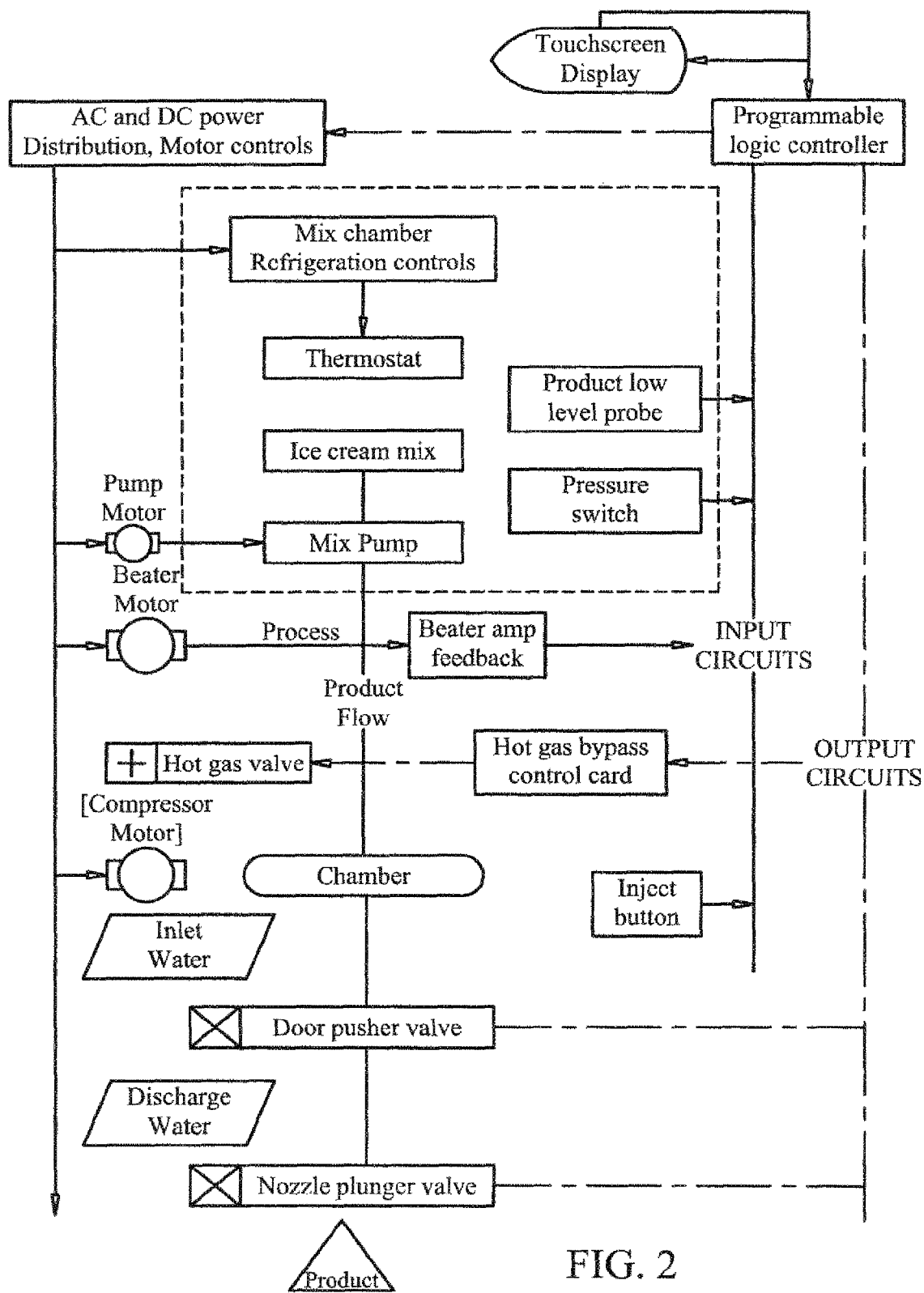
FIG. 2 depicts the interaction between the components of an embodiment of a dispensing apparatus of the present invention.
Figure 3:
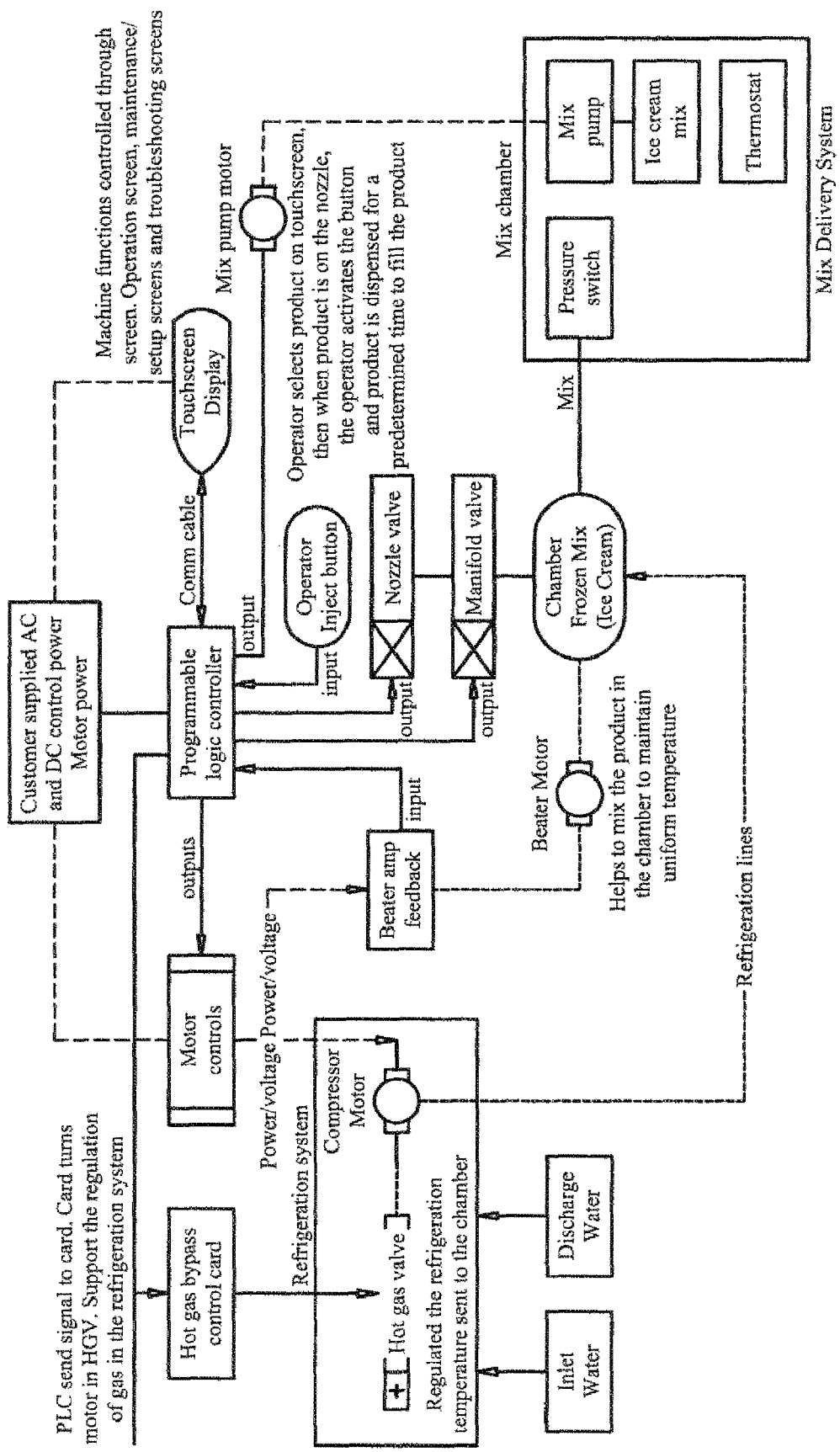
FIG. 3 is an additional diagram showing the interaction between the components of an embodiment of a dispensing apparatus of the present invention.
Figure 4:
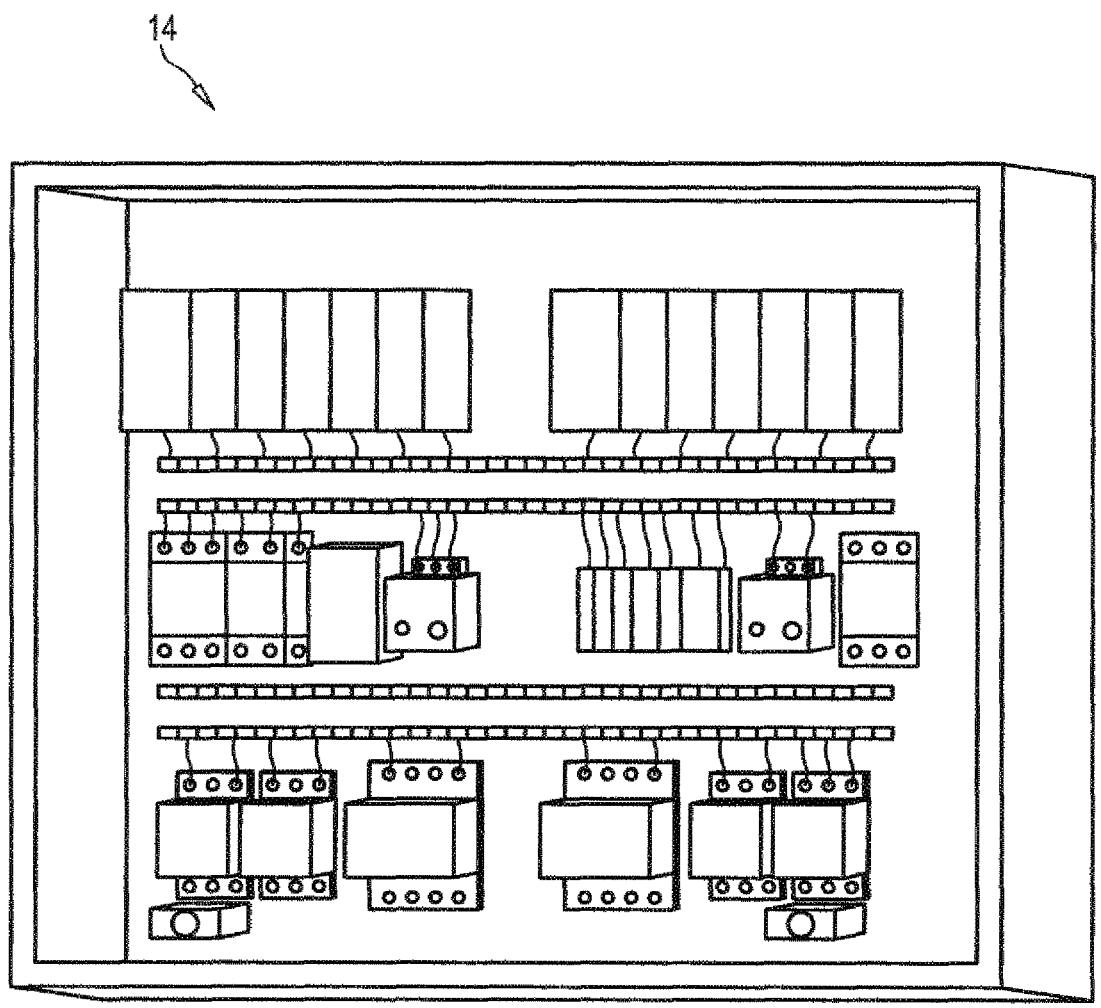
FIG. 4 illustrates an embodiment of an electrical system of a dispensing apparatus of the present invention.

Now referring to FIGS. 2-3, an exemplary block diagram of the electrical system providing control over various machine components is depicted. The electrical system may generally include a series of electrical components in communication with each other to power and/or control one or more of the various other components of the dispensing apparatus 10. For example, now referring to FIG. 4, the electrical system may include a power circuit breaker that protects the electrical components of the apparatus 10 in general. A control circuit breaker may be provided to protect the power supplies and transformers of the apparatus 10. The electrical system may also include a control power circuit breaker for protecting one or more compressors of the apparatus 10, as well as a current transformer for collecting the amperage or load of the beater motor (discussed below). The current transformer output may be connected to an analog input module of a programmable logic control (PLC) within the apparatus 10, where the PLC may include a power supply such as a battery, as well as electronic storage medium. The electrical system of the present invention may further include a DC power supply for powering the components and systems of the apparatus 10. One or more input and/or output cards may be provided for relaying and/or providing signals to the PLC, such as the output from current transformers and the like. The electrical system may include one or more transformers coupled to a hot gas valve controller, as well as a contactor for a compressor motor and a starter for a beater motor for controlling the power thereto.

In addition, the electrical system may include a communication card or device that allows the apparatus 10 to both send and receive electrical signals across a network either through a fixed medium or wirelessly, as well as a data storage device including electrical, magnetic, and/or optical storage devices and medium. For example, the apparatus 10 may include an ethernet card and/or wireless transceiver coupled to the PLC for communication therewith. The electrical system may be coupled to an optical sensor or other proximity activation element for initiating an extrusion cycle, as described below. Alternatively, a foot pedal or other suitable actuating mechanism may be integrated to initiate dispensing or injection of the edible product.

The refrigeration system may generally include a pressure switch, cooling coils, a compressor, a hot gas mixing valve and a water pressure regulator. In the event a portion of the refrigeration system exceeds a predetermined or desired temperature, gas pressure may increase and thereby damage components of the apparatus 10. To prevent such an event, the pressure switch may convey an indication of the temperature and/or pressure to the PLC, which may subsequently initiate a shut-down of one or more processes of the apparatus 10, which may further include a visual indicator on the operator interface. The cooling coils may be integrated to cool hot gas created by the compressor, where the compressor may be operated to cool one or more chambers storing or containing the frozen edible product. The hot gas mixing valve may control or otherwise monitor the flow of gas through the apparatus 10, while the water pressure regulator may provide water flow through a portion of the system in proportion to the temperature and/or current operating parameters of the apparatus 10. In particular, the hot gas valve may be controlled by an electronic circuit board in communication with the PLC and/or an analog input/output card. The beater motor amperage may be monitored as the input parameter for regulating the hot gas valve position. As hot gas is required to warm the product chamber, the PLC may signal the circuit board to open or close the hot gas valve to maintain a predetermined or preset amperage of the beater motor. By regulating the temperature of the chamber based on the amperage or operating condition of the beater motor, the frozen product is more likely to have a consistent texture and temperature, thereby ensuring repeatable quality of the product. Typical machines of the prior art often rely on a chiller or compressor to turn on and off at a particular time, where such timed operation decays as the system ages and result in inconsistent product conditions.

In addition, the refrigeration system may further include a mix chamber for mixing and/or otherwise processing a frozen edible product mixture into the desired state, where the mix chamber may be coupled to a thermostat, a mix chamber compressor, a mix chamber condenser, as well as a standby thermostat. The mix chamber thermostat may monitor and/or maintain the mix chamber temperature at or below a predetermined threshold at which the frozen edible product may be dispensed, while the mix chamber compressor provides the cold air that chills or otherwise provides for a desired temperature of the mix chamber. In addition, the mix chamber condenser allows heated gasses created by the compressor to cool and run back into the compressor for subsequent cooling of the mix chamber. The standby thermostat may activate a chilling cycle when the apparatus 10 is placed in a standby mode. For example, once the mix chamber reaches a predetermined threshold, the thermostat may signal the PLC to activate the compressor until a particular temperature is reached, upon which the operation of the compressor will cease until needed again.

The product preparation system of the apparatus 10 of the present invention may generally include a mixing pump, a mixing pressure switch, a beater motor, a mixing pump motor, one or more pulleys and belts, and one or more level probes. The apparatus 10 is capable of dispensing soft-serve ice cream into open containers or can inject a frozen edible product, such as hard ice cream, into an edible item. The mix pump may generally pump a liquid product used in preparation of the frozen edible product into a refrigeration chamber or mix chamber. When the mix pump has filled the chamber receiving the liquid product, the flow of the liquid product may activate a switch in the holding or mixing chamber, where the switch is activated at a predetermined pressure level to send a signal to the PLC, which subsequently discontinues pumping once the chamber has been filled to a particular level. The beater motor may be mechanically connected to a gearbox by the one or more pulleys or other similar mechanical coupling, where the gearbox is further coupled to a beater bar unit inside the product chamber. The motor causes the stirring of the bar while the liquid product is being chilled. To obtain a particular temperature and/or consistency of the frozen edible product being prepared in the mix chamber, the output or speed at which the beater motor is operating may be used as in indication or measure of the consistency and/or readiness of the product to be dispensed. Upon appropriate freezing of the product and/or once the product reaches a desirable temperature for dispensing, it may be moved towards a portion of the chamber predisposed for dispensing. The level probes of the product preparation system may indicate when the mixing container has reached a low level, which may also be used to initiate a filling sequence by which additional liquid product is moved to the mixing container.

Figure 5:
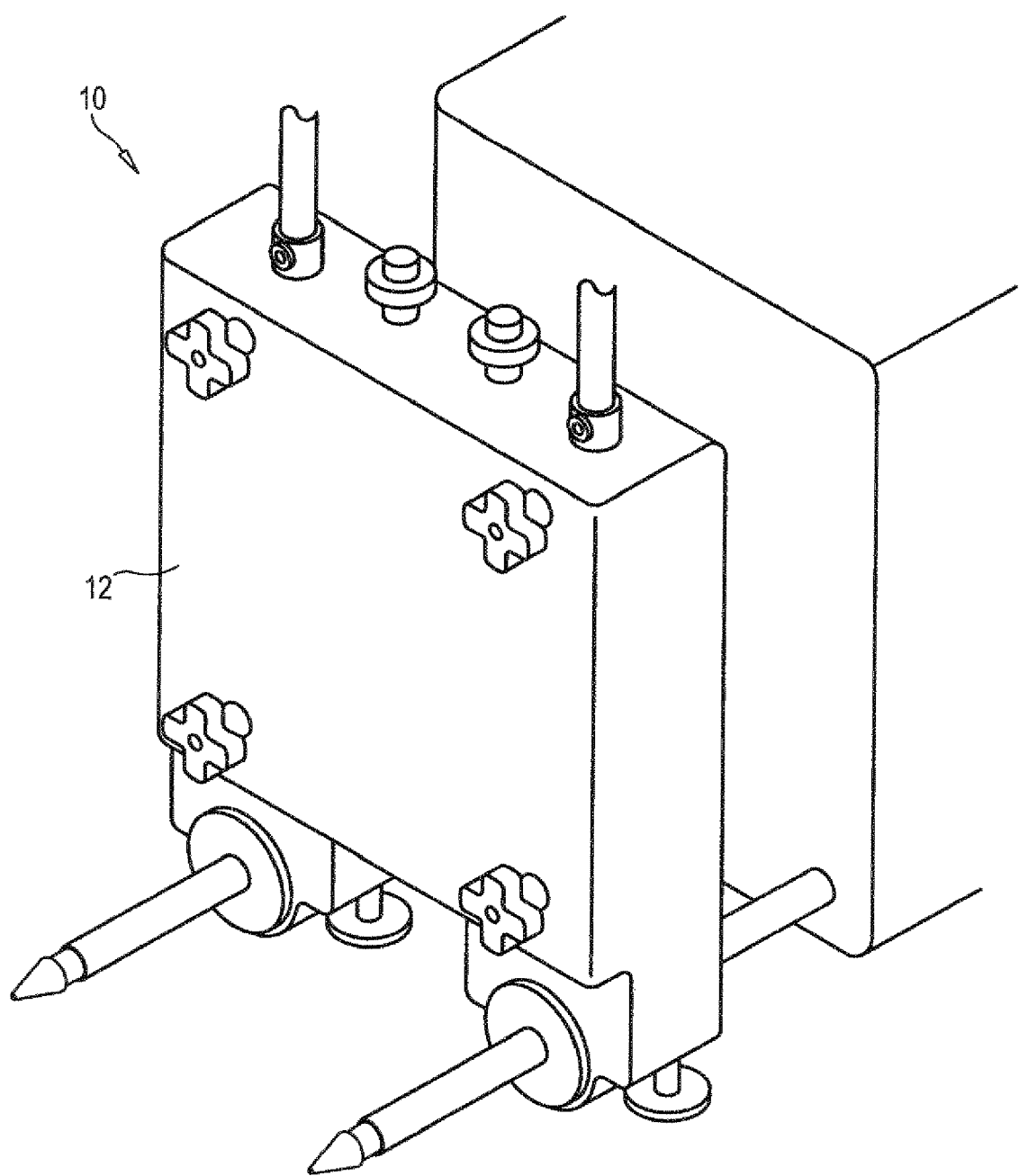
FIG. 5 shows an embodiment of a dispensing system of a dispensing apparatus of the present invention.
Figure 6:
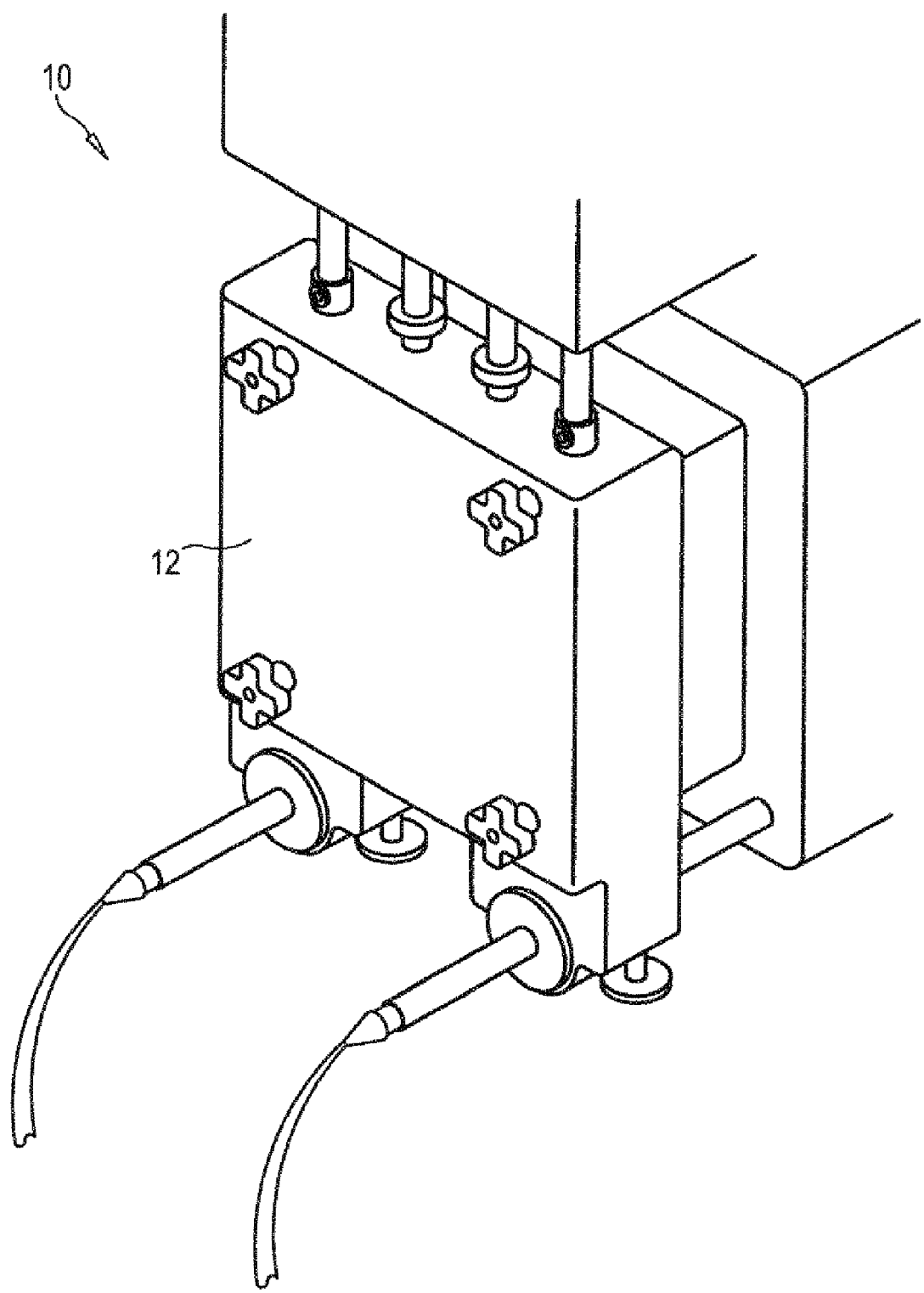
FIG. 6 depicts another embodiment of a dispensing system of a dispensing apparatus of the present invention.

Now referring to FIGS. 5 and 6, the dispensing system of the apparatus 10 may generally include a chamber manifold, a chamber purge valve, a chamber air cylinder, a nozzle air cylinder, a nozzle solenoid valve, and a chamber solenoid valve. The chamber manifold may generally define a block or housing containing one or more dispensing control components and/or cavities therein. Within at least a portion of the manifold, a passage may be provided to allow any air built up during the dispensing process to be evacuated. The purge valve may allow the operator to remove the air by actuating the plunger to allow the air to exit the bottom of the manifold. Timely evacuation of excess air build-up may provide an increased consistency with which product is dispensed. The purge valve may be automatically controlled by the control circuit such that air is released routinely according to a preset timing schedule, which may further ensure the consistency and desired state of the frozen edible product product. The chamber air cylinder opens and closes the plunger of the manifold to allow frozen edible product to proceed to the nozzle plunger. The nozzle solenoid valve may include an electro-pneumatic valve controlled by the PLC. For example, the valve may be actuated such that air is switched into the nozzle air cylinder to open or close the nozzle plunger. The chamber solenoid valve may also include an electro-pneumatic valve controllable in part by the PLC. When this valve is actuated, air may be switched in the chamber air cylinder to open or close the chamber plunger. The plungers may include o-rings or the like to adequately seal the movement of the plunger in its respective passage. When dispensing is desired, the nozzle plunger retracts then extends, thereby injecting or dispensing the frozen product.

Figure 7:
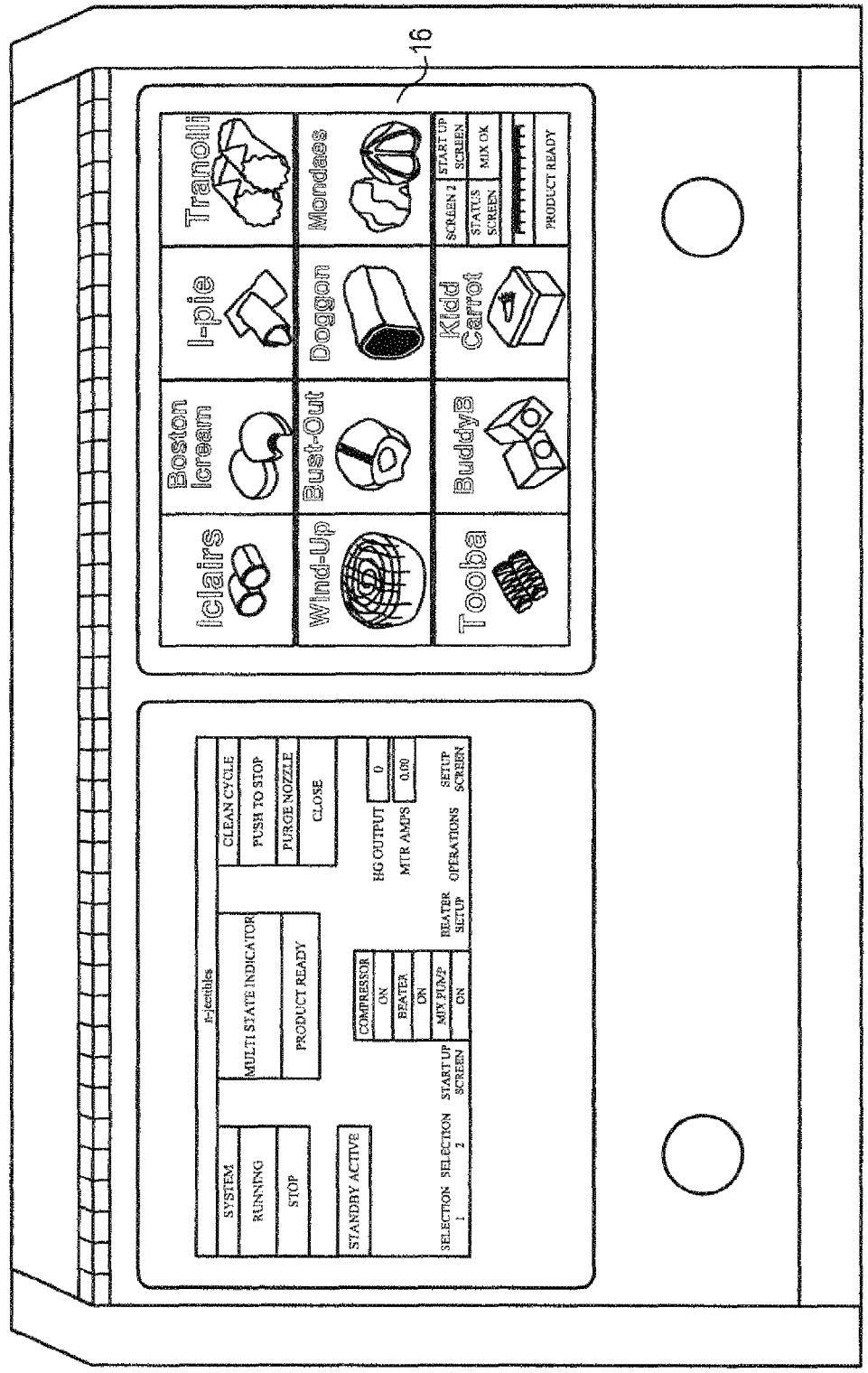
FIG. 7 illustrates an embodiment of an operator interface of a dispensing apparatus of the present invention.
Figure 8:
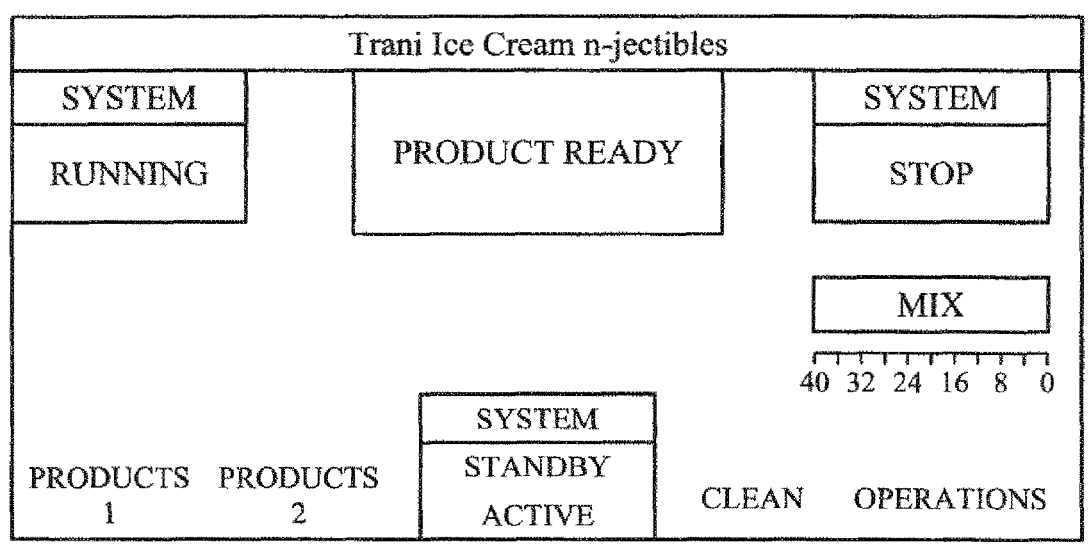
FIG. 8 shows a simulated display of an operator interface of a dispensing apparatus of the present invention.
Figure 10:
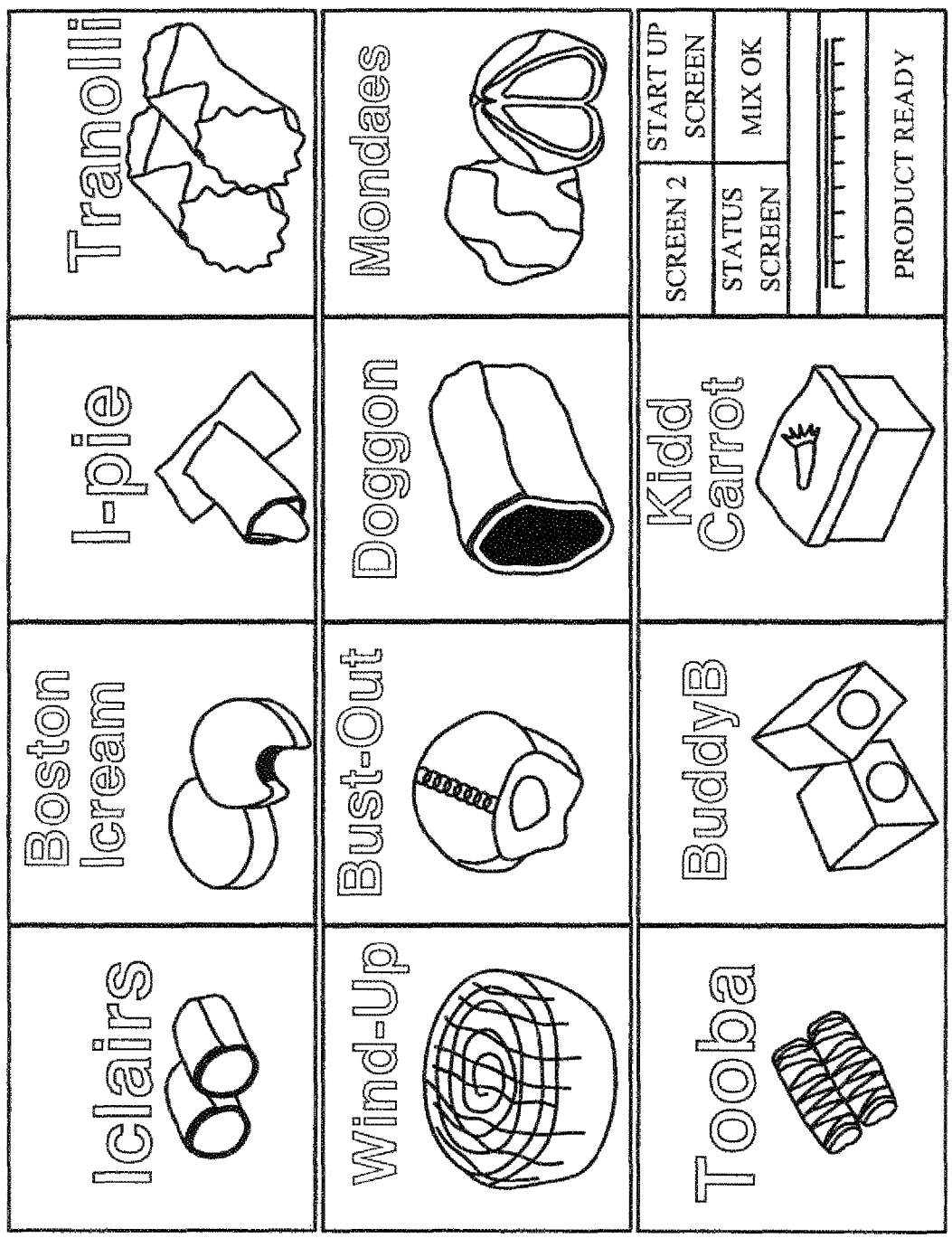
FIG. 10 illustrates an additional simulated display of an operator interface of a dispensing apparatus of the present invention.
Figure 11:
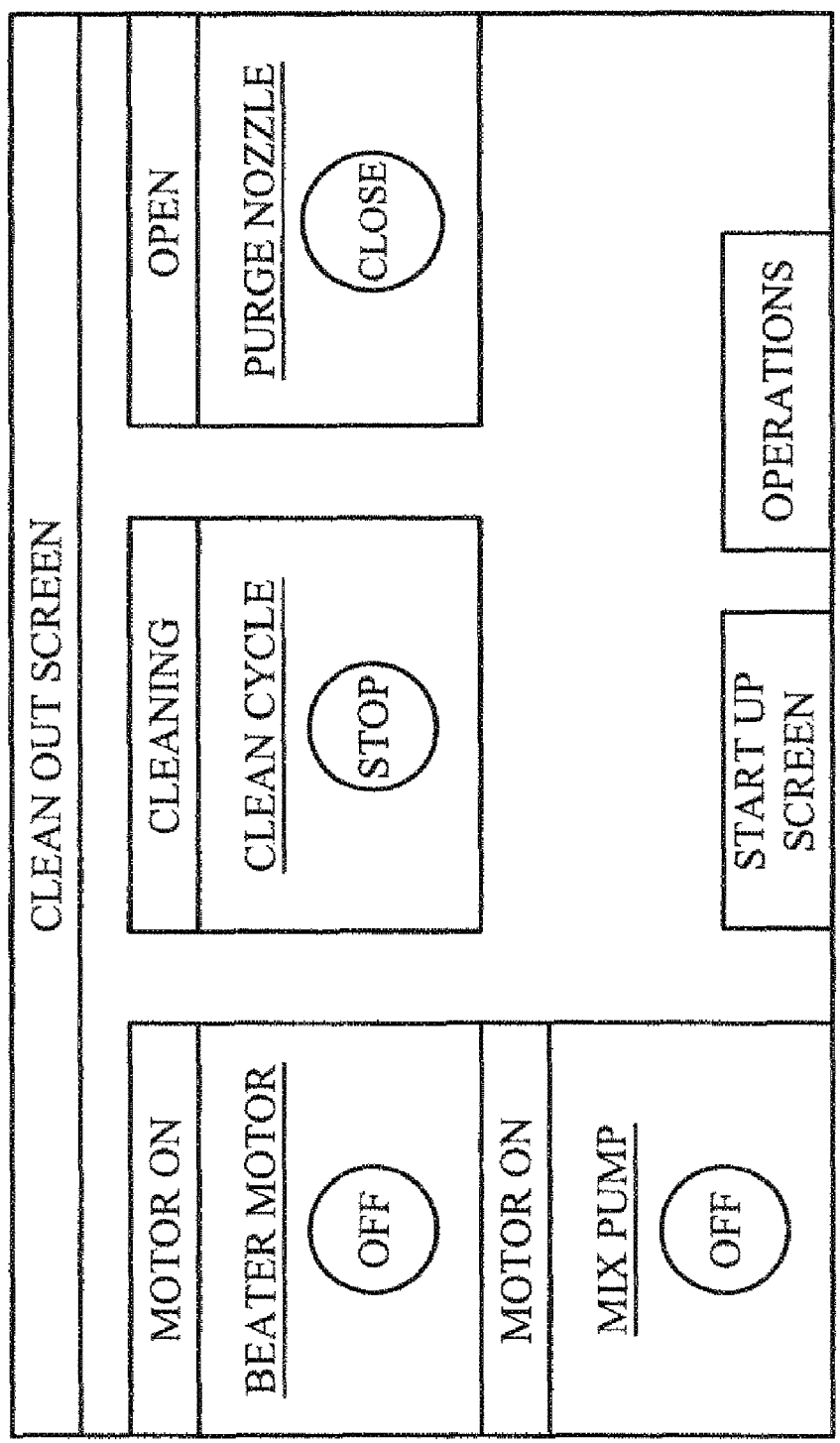
FIG. 11 shows still another simulated display of an operator interface of a dispensing apparatus of the present invention.
Figure 12:
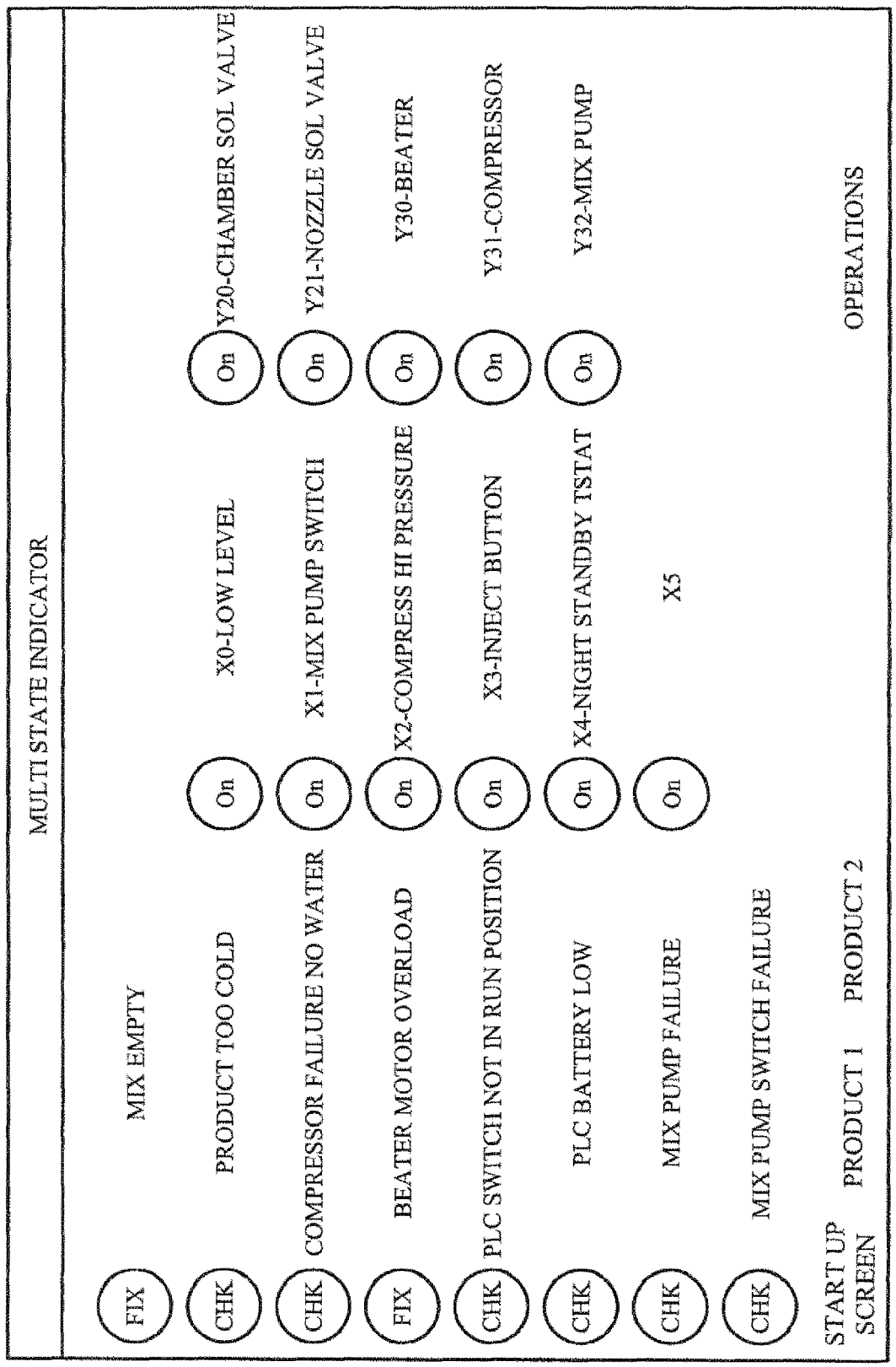
FIG. 12 depicts another simulated display of an operator interface of a dispensing apparatus of the present invention.

Now referring to FIG. 7, the operator interface is coupled to the electrical system to provide a means for an operator to input parameters for controlling operation of the machine. The operator interface of the dispensing apparatus 10 may generally include a visual display, such as a touch screen LCD or the like, and may generally include controls to start, stop and/or pause the machine or any individual component thereof. The visual display may be coupled to or otherwise include a memory component for storing programmed images, menus, and/or other operating functions. The operator interface may further include an optical or proximity sensor for initiating the dispensing or injecting process of the apparatus 10, as described above. The operator interface can provide additional information such as temperature of the frozen edible product via a digital readout. The operator interface unit can be located on or in the machine or at a remote location. The operator interface can be directly connected to the electrical system or can transmit signals to be received by the electrical system, i.e. "wireless". In one embodiment, the operator interface unit is located on a top portion of the machine and the electrical system is contained within the housing of the apparatus 10. The electrical system is coupled to the operator interface to receive and store the various control parameters input by an operator. The electrical system can implement the desired control using discrete components, timer integrated circuits, processors and/or programmable devices, as described above. The operator interface and/or electrical system may include one or more security measures to restrict tampering of preset parameters to authorized individuals only.

The operator interface 16 may include programmed procedures, protocols and/or other operating parameters to ease use of the apparatus 10, as well as to remove the likelihood for operator error or inconsistencies which could lead to substandard product preparation. For example, the operator interface may include automatic, preset procedures for initial apparatus 10 startup, product dispensing, apparatus 10 cleaning cycles, and/or hibernation or "overnight" modes by which the apparatus 10 may operate, as illustrated in the simulated visual displays of FIGS. 8-12. Typical dispensing machines of the prior art included various steps that were manually required for the proper preparation, dispensing, and even cleaning of a particular machine. For example, to prepare the mix into a desired frozen state, perhaps a particular temperature had to be reached, while airflow and hot gas were manually controlled at particular instances by an operator, i.e., "bleed excess air," "then turn on compressor," "wait approximately two minutes, then turn on pump," etc. The outcome of such procedures could widely vary depending on how accurate the operator is in following them, and the likelihood for errors and/or inconsistencies is very high. With the apparatus 10 of the present invention, the various events and components needed to be activated, and any timing schedule for doing so, may be predetermined and programmed into the electrical system. For example, once the optimal parameters for a particular operation are determined, i.e., initial product preparation, the memory of the PLC may be programmed with the desired routine to provide the optimal result, in this case being the preparation of a product having consistent, repeatable qualities and characteristics. As such, the chance that operator error or inaccuracies will affect the product output is virtually eliminated. The apparatus 10 of the present invention may include a display on the operator interface that allows for a one-touch or single action initiation of the product preparation procedure, and may further include a visible indication of when the product has been prepared and is thus ready for dispensing. Moreover, the apparatus 10 may have plurality of production protocols or profiles for variations in mix types. For example, particular flavors or types of mixes may have different optimal preparation parameters as far as temperature, beater speed, duration, etc. The apparatus 10 may include these varying profiles such that an operator need only identify the particular mix being used before initiating a production sequence.

In addition to inconsistencies in product preparation, previous dispensing machines would also vary widely in the actual amount of product dispensed, as the dispensing was typically controlled manually by an operator, i.e., by pulling a lever or the like. As a result, the actual amount or volume of dispensed product could be directly affected by the operator. The apparatus 10 of the present invention may include nozzles and/or plungers as described above that are either electrically or pneumatically controlled to travel a preset distance, thereby dispensing a uniform and accurate volume or amount of product. Moreover, the operator interface may include a menu of items, where each of the items available for use with the dispensing apparatus 10 have a predetermined, preset amount or volume of dispensed product associated with them. For example, the operator interface may include a display for an LCD or touch screen having a plurality of available edible products illustrated, where each of the available product has a predetermined volume or amount of frozen product associated with it. The preset, predetermined frozen edible product amounts correlating to a particular edible product for use with the apparatus 10 may be stored in the memory of the PLC. Moreover, the preset volume or amount of frozen edible product may further include parameters for operating the nozzles and/or plungers of the apparatus 10 to actually dispense the predetermined amount. For example, upon selecting a desired product from the menu, the PLC may then convey a signal to the nozzles and/or plungers to move a preset distance and/or to dispense for a preset amount of time, thereby providing a consistent, desired volume time and time again for a given product.

For cleaning of a particular dispensing machine, a protocol or procedure having various manual steps may typically be required. For example, instructions for cleaning may include such steps of "turn off refrigeration," "replace mix container with water or cleaning solution," "cycle nozzles/plungers until water exits nozzles," etc. Similar to the product preparation stage, the efficacy and/or thoroughness of a particular cleaning cycle may vary widely depending on the accuracy of an operator to follow the instructions and complete each step as described. With respect to the present apparatus 10, the particular parameters and/or settings with which the components of the apparatus 10 should operate to properly and thoroughly clean the apparatus 10 may be preprogrammed and/or saved in the memory of the PLC. As such, an operator need only actuate a cleaning cycle via the operator interface, which may simply include a single button on the touch screen. Once actuated, the preset program may run, i.e., refrigeration may be deactivated, the nozzles and/or plungers may be cycled to dispense unused frozen product for a predetermined period of time, the beater motor may be deactivated, etc. As a result, an optimal, predictable and repeatable cleaning procedure may be easily performed, regardless of operator efficiency or skill.

The dispensing apparatus 10 may further include a standby mode in which it is not necessary for the machine to have frozen product ready for dispensing for a prolonged period of time (i.e., overnight, days when store is closed, etc.). In this standby or hibernation mode, the beater motor may be deactivated so that any mix in the mixing container is not being agitated. Moreover, the refrigeration system may be set to a temperature higher than that of normal operating conditions when frozen edible product is being made, but remaining low enough that the ingredients in the apparatus 10 do not risk being spoiled or contaminated due to warmth. As such, the apparatus 10 may remain in this standby mode for a prolonged duration without the need to clean the machine and without spoiling or contamination. In addition, by modifying the temperature requirements and ceasing operation of the beater motor, the apparatus 10 will thereby consume less energy and/or water compared to when the apparatus 10 is in normal operation. Once normal operation of the apparatus 10 is again desired, the apparatus 10 may simply purge the cooled ingredients and draw fresh mix into the mixing container for preparation of a fresh batch of frozen edible product. Subsequently, the refrigeration system may once again lower the temperature to an appropriate production level, and the beating motor will be activated as well. The standby mode allows the apparatus 10 to reach production quicker than would otherwise be possible if the apparatus 10 was simply shut down completely, which would also necessitate cleaning and therefore involve a longer downtime.

The operator interface may further include visible indicators of the status and/or condition of the various operating parameters of the apparatus 10, including data regarding time of use, product temperature, mix levels, and/or diagnostic information regarding particular components of the apparatus 10. For example, the operator interface may include a beater status display listing the rpm or amperage of the beater motor, as well as the setpoints or targets at which the beater and/or motor should operate. In addition, should a particular component of the apparatus 10 being operating outside of a predetermined parameter or range, or cease to operate at all, the operator interface may provide a visual signal or indication of a system malfunction or error.

During typical use, frozen product may proceed from the mixing chamber to the manifold chambers until dispensing is commenced. An operator may select a desired product from the menu shown on the operator interface. Upon selection of the desired item, the apparatus 10 may correlate the selection to a predetermined volume or amount of frozen edible product to be dispensed, and the PLC may convey appropriate control signals to the components of the apparatus 10 to in preparation of dispensing the predetermined amount. Once dispensing is desired, the operator may actuate the optical or proximity sensor. The PLC and/or electrical system detects activation of the sensor and causes nozzles and/or plungers to be energized for a predetermined amount of time or to travel a preset distance, where the time and/or distance corresponds to a selected volume of frozen edible product to be extruded from the machine. In a single-stroke embodiment, the nozzle plunger retracts than extends, thereby dispensing the predetermined amount of frozen product associated with the selected item out of the nozzle. The nozzle plunger may be actuated pneumatically or electrically, and may include a tapered or bullet-nose shaped tip to ease the piercing of certain edible products. In a two-stroke embodiment of a dispensing apparatus 10, horizontal and vertical plungers may be pneumatically or electrically retracted for a specific, predetermined amount of time, thereby setting a specific amount of frozen product to be dispensed. During and/or after activation of the plungers, the PLC may energize the mix pump to cause mix to flow from the mix receptacle to the mixing chamber to replace the dispensed amount of frozen product.

Throughout the use of the apparatus 10, various information regarding the time of use, quantities distributed, particular status of the various components, and the like of the apparatus 10 may be recorded and stored in the memory of the apparatus 10, and may further be transmitted via the communication device to a central clearinghouse and/or corporate entity for review and analysis. In addition, the trends and indicated uses of the apparatus 10 may be used in establishing a supply schedule or the like for optimal incorporation and use of the apparatus 10 for a particular business.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of preparing an edible item including:
   identifying a plurality of edible items;
   associating a predetermined portion of flowable edible product with each of the edible items;
   associating an edible item image with each of the edible items and with the predetermined portion of flowable edible product;
   providing a supply of flowable edible product;
   presenting a plurality of edible item images on a visual display;
   selecting a single edible item image from the plurality of edible item images presented on the visual display;
   dispensing the predetermined portion of flowable edible product associated with the edible item associated with the edible item image;
   piercing the edible item; and
   injecting the flowable edible product within an interior portion of the edible item.

2. The method of claim 1, further including:
   collecting data related to one of the selection of the single edible item image and the predetermined portion of flowable edible product dispensed.

3. The method of claim 2, further comprising transmitting the collected data in substantially real-time.

4. The method of claim 2, further including storing the collected data.

5. The method of claim 3, further including outputting the stored, collected data.

6. The method of claim 4, wherein outputting the stored, collected data includes transmitting the stored, collected data.

7. The method of claim 1, further including displaying information about the supply of flowable edible product.

8. A method of preparing a partially frozen edible item including:
   providing a supply of flowable frozen edible product
   identifying a plurality of edible items;
   associating a predetermined portion of frozen flowable edible product with each of the edible items;
   associating an edible item image with each of the edible items and with the predetermined portion of frozen flowable edible product;
   selecting a single edible item image from a plurality of edible item images presented on a visual display;
   piercing the edible item;
   injecting the frozen flowable edible product within an interior portion of the edible item by retracting and then expanding a plunger nozzle exposable to the frozen edible product.

9. The method of claim 8, wherein the plunger nozzle is retracted pneumatically.

10. The method of claim 8, wherein the plunger nozzle is retracted electrically.

11. A method of preparing a partially frozen edible item including:
    providing a supply of flowable frozen edible product
    identifying a plurality of edible items, the plurality of edible items including at least one baked good;
    associating a predetermined portion of frozen flowable edible product with each of the edible items;
    associating an edible item image with each of the edible items and with the predetermined portion of frozen flowable edible product;

selecting a single edible item image from the plurality of edible item images presented on a visual display;
penetrating the edible item;
depositing frozen flowable edible product within an interior portion of the edible item by retracting and then expanding a plunger nozzle exposable to the frozen flowable edible product.

12. The method of claim 11, wherein the plunger nozzle is retracted pneumatically.

13. The method of claim 12, wherein the plunger nozzle is retracted electrically.

* * * * *